United States Patent Office 3,662,045
Patented May 9, 1972

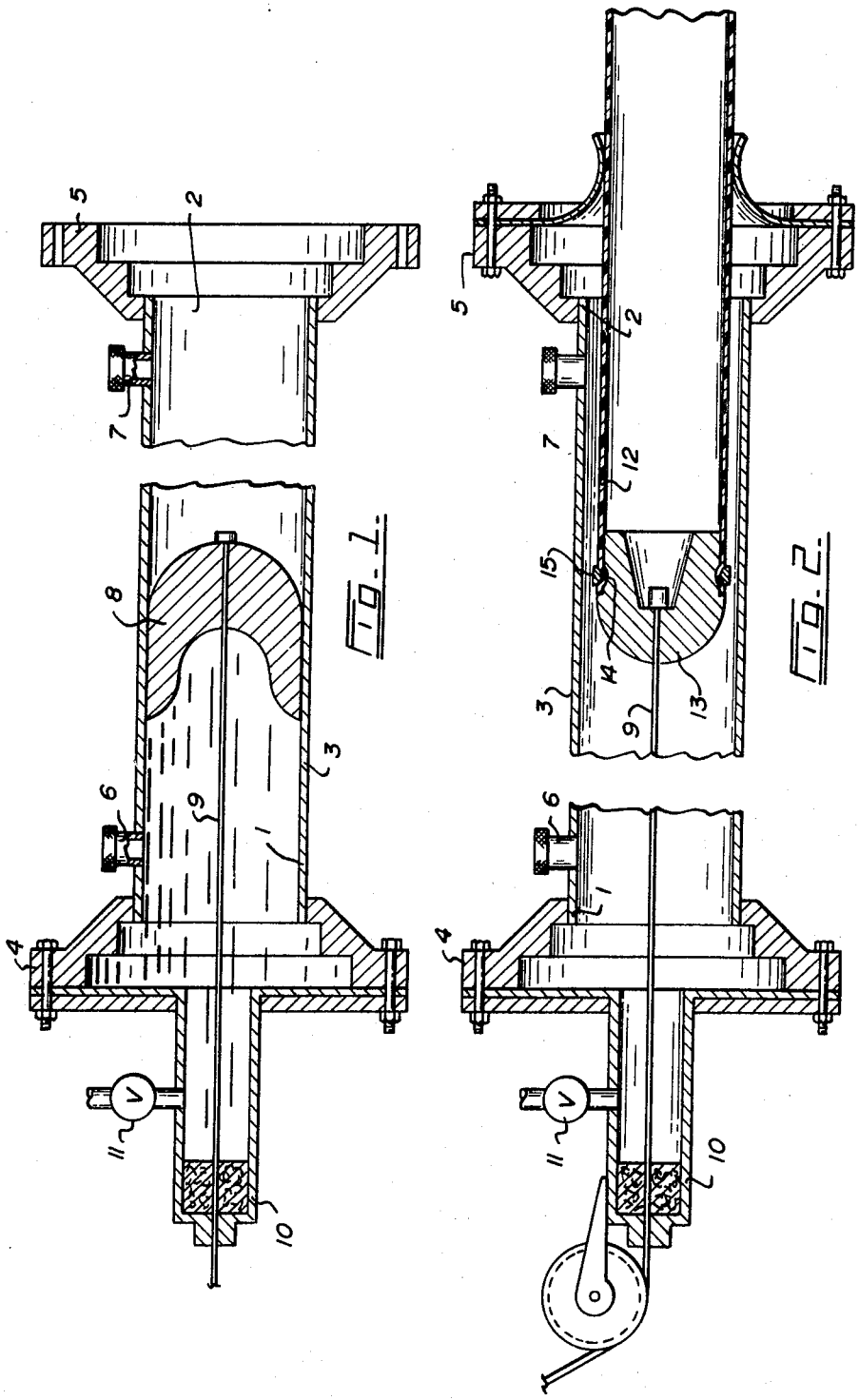

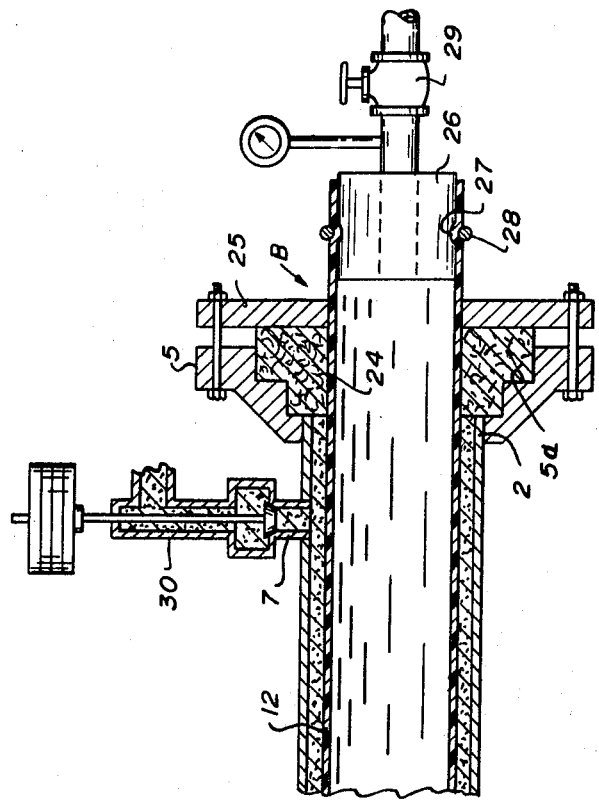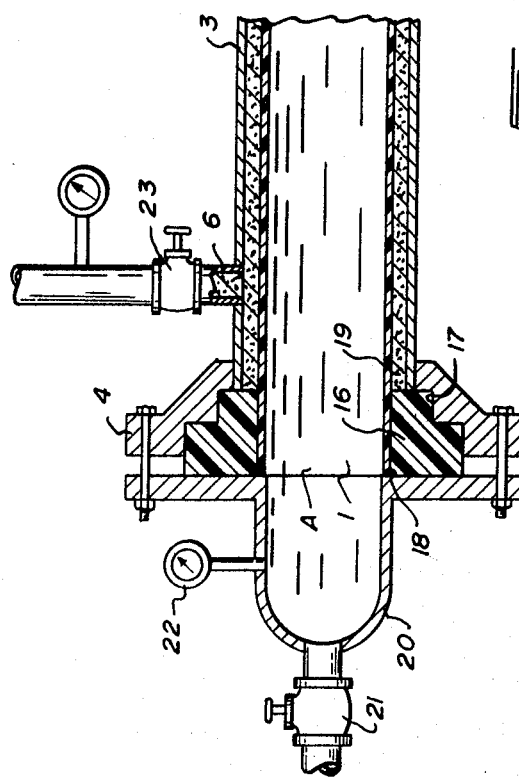
Fig. 3.

3,662,045
METHOD FOR PROVIDING A CEMENT SHEATHED PLASTIC LINER WITHIN A FLOWLINE
Kenneth Tierling, 39 Heron Road,
Sherwood Park, Alberta, Canada
Filed Apr. 24, 1970, Ser. No. 31,651
Int. Cl. B32b 31/06
U.S. Cl. 264—35       2 Claims

ABSTRACT OF THE DISCLOSURE

A thermoplastic liner is threaded into an oilfield flowline. An annular space is defined between liner and flowline. The liner is cemented in place by: plugging one end of the liner and the two ends of the annular space; filling the liner with water; pumping cement into the annulus while controlling the cement pumping pressure and the liner pressure so that the pressure within the liner is always greater than the pressure in the annulus but less than the liner rupture pressure.

BACKGROUND OF THE INVENTION

This invention relates to a method of lining flowlines. More particularly, it is concerned with lining flowlines, such as steel oilfield flowlines and the like, with a thermoplastic liner.

Some steel flowlines are exposed to corrosive agents. For example, oilfield lines running between a well and a central tank farm often carry some salt water. With time these lines become deeply pitted by corrosion and can eventually leak.

It is known to install thermoplastic liners in such flowlines to protect them. It is also known to use a liner of smaller outside diameter than the inside diameter of the flowline and to fill the annular space defined between the two with a solid material. This is done to protect the liner from the pressure of the fluid being transported. Since the liner is weak, it would be likely to rupture if not encased by a strong container.

The state of the art is illustrated by the following U.S. patents: 2,522,171—Furman; 2,690,806—Britton; 3,202,562—Lang; 3,230,129—Kelly; and 3,301,277—Kelly.

The methods which are known in the art are, generally speaking, expensive. In addition, they do not teach a method which can be used to install a plastic liner and surrounding cement sheath in a buried flowline of substantial length.

It would be advantageous to provide a simple method of lining such a flowline with a thermoplastic-resistant liner using inexpensive cement as the filler between the liner and the flowline.

It is therefore the object of this invention to provide a method for installing a cement-sheathed thermoplastic liner in a flowline. The phrase "field flowline" as used in the claims is intended to mean any elongate flowline which forms a part of a working system, such as an oilfield gathering system.

SUMMARY OF THE INVENTION

The method of the invention comprises the following steps: providing a tubular thermoplastic liner at one end of an open-ended flowline, said flowline having an inlet formed in its wall adjacent one end thereof and an outlet formed in the wall adjacent the other end, said liner having a smaller outside diameter than the inside diameter of the flowline and being of sufficient length so as to extend through the flowline; installing the liner in the flowline so that it extends therethrough, whereby an annular space is defined between them; plugging one end of the liner with valve means which can be opened and closed as required and plugging the inlet and outlet ends of the annular space, as with packing and the like; equipping the outlet of the flowline with valve means to control flow through the annular space; displacing the air in the liner through the valve means with fluid, such as water; closing the valve means; pressuring up the fluid within the liner without rupturing it; displacing the contents of the annular space through the outlet with fluid cement pumped in through the inlet while holding back pressure at the outlet end of the annular space with the valve means at that end; controlling the cement pumping pressure and the pressure within the liner during displacement to ensure that the pressure within the liner is equal to or greater than the pressure in the annular space and to further ensure that the pressure within the liner does not exceed the liner rupture pressure whereby the liner is neither collapsed or ruptured; and shutting in the system once the annular space is filled with cement for a period of time to allow the cement to set.

DESCRIPTION OF THE DRAWINGS

In the drawings:
FIG. 1 is a sectional view illustrating a method of threading a wireline through a flowline.
FIG. 2 is a sectional view illustrating a method of installing a liner in the flowline.
FIG. 3 is a sectional view illustrating the liner in place and the flowline headed up ready for the cementing operation.

DESCRIPTION OF THE PREFERRED EMBODIMENT

The particular composition of the liner does not form part of the present invention. I use polyvinylchloride pipe. It is commercially available in coils of sufficient length to extend through most flowlines.

The size of the liner used, relative to the size of the flowline, is a matter of choice. However, the annular space between liner and flowline should be large enough to allow the cement to flow easily through it without having to use high pumping pressures. As a guide, Table 1 lists the outside diameters of a number of standard oilfield flowlines together with the outside diameter of the liner which I usually use in conjunction therewith:

TABLE I

| Flowline outside diameter, inches: | Linear outside diameter, inches |
|---|---|
| 2" line pipe nominal | 1.660 |
| 3" line pipe nominal | 2.375 |
| 3" line pipe nominal | 2.875 |
| 4" line pipe nominal | 3.500 |
| 6" line pipe nominal | 4.500 |

Techniques are known for installing a thermoplastic liner within a flowline. I prefer to use the procedure wherein a flowline pig, attached to the first end of a wire cable is pumped through the flowline. The cable is attached at its second end to the liner. Upon pulling the cable through, the liner can be drawn into the flowline. This sequence is illustrated in FIGS. 1 and 2.

More specifically, I begin the liner installation by preparing the ends 1, 2 of flowline 3. If the line is buried, this involves excavating the ends of the section of flowline 3 to be lined and cutting out short spools at each end so as to gain access thereinto. Flanges 4, 5 are welded to the flowline ends 1, 2. At the same time, the wall of the pipeline 3 is tapped adjacent to the ends 1, 2 to provide inlet and outlet ports 6, 7.

After this preliminary work a pig 8, attached to one end of wireline 9, is introduced into the flowline end 1. A conventional wireline lubricator 10, which has had the end of wireline 9 threaded therethrough, is bolted to flange 4. Ports 6, 7 are blanked off. Fluid is pumped into the flowline 3 through the lubricator valve 11 to force pig 8 toward flowline end 2. Wireline 9 is thus drawn into the flowline 3.

Wireline 9 is then used to thread liner 12 in and through flowline 3 from end 2. The first step in this operation involves securing plug 13 to one end of liner 12. Plug 13 has a circumferential groove 14 formed in its surface. The end of liner 12 is heated to make it pliable; a clamping strap 15 is then cinched around liner 12 to draw it into groove 14 and lock the liner and plug together. The wireline 9 is pulled through the flowline 3 to place the liner 12 therein. Lubricator 10 is removed and an excess of liner 12 pulled through.

Once the liner 12 is in place, it is headed up at end A. This involves slipping a thermoplastic insert flange 16, usually made of polyvinylchloride, over the end of liner 12 so as to seat it in the counter bore 17 of flange 4. The insert flange 16 is solvent welded about its circumference to liner 12 and then plastic welded at 18 to firmly bond them together. The insert flange 16 acts to plug the A end of the annular space 19 defined between the liner 12 and flowline 3.

A flanged conventional cementing head 20, equipped with inlet valve 21 and pressure guage 22, is bolted to flange 4. In addition, a valve 23 is connected into inlet port 6.

Turning to end B, the end of annular space 19 is packed off. I slip rope packing 24 over the end of liner 12 and tighten it into the counter bore 5a of flange 5 using flange 25 and suitable bolts. The rope packing 24 is particularly useful because it will permit longitudinal movement of liner 12 while still providing an effective seal therearound.

A bored plug 26 having a circumferential groove 27 is fixed in the end of liner 12 with a strap 28, as above. A valve 29 is then screwed into plug 26 for controlling flow therethrough. A back pressure valve 30 is connected into outlet port 7.

The stage has now been set for the pumping operation.

The air within liner 12 is displaced with an incompressible fluid, usually water. This is done by connecting a pump (not shown) to the cementing head 20, opening valve 21, cracking valve 29, and pumping water into the liner 12 while holding back pressure to prevent entrapment of air therein.

Once liner 12 is filled with water, valve 29 is closed. The pump is actuated to increase the pressure within the liner 12 to a pressure greater than that which is expected to develop in the annular space 19 when the cement is pumped thereinto, but less than the pressure at which liner 12 will rupture. It will be appreciated that the cement pumping pressure will vary depending on friction losses and terrain conditions. Therefore one will only make a rough guess as to the pressure which will develop in the annular space 19. However, the liner pressure can be adjusted with the pump as the cementing operation proceeds.

The air in the annular space 19 is now displaced, preferably with water. The water is pumped in through inlet port 6 using a second pump (not shown). Air is exhausted through the outlet port 7. Back pressure is maintained within the annular space 19 during this operation by means of valve 30.

The water in the annular space 19 is now displaced in the same manner as the air with hydraulic cement. Preferably, the cement used is slow-setting oilwell neat cement mixed at about 14.2 lbs. per gallon. A conventional water loss additive is provided in the cement; I find that water which breaks out tends to agglomerate at high spots in the line with the result that sheathing is lacking in those places. Additionally, a conventional low viscosity additive is usually also included in the cement; the pumping pressure of the cement will be reduced if the viscosity is lowered. To give a complete fill, the cement should be pumped at turbulent flow; however, I have successfully practised the invention in level terrain while pumping the cement at laminar flow conditions.

The system is then closed in by closing valves 21, 23 and 30. It is left in this state for sufficient time to allow the cement to set.

Once the cement is set, the pressure is bled off from liner 12. The cementing head 20, valves 23, 30, plug 26, flange 25 and rope packing 24 are all removed. An insert flange, similar to insert flange 16, is fixed in counter bore 5a by solvent and plastic welds. The B end of liner 12 is cut off flush with the insert flange. The ports 6, 7 are blanked off. At this stage, the flowline is ready for use.

The invention is illustrated by the following example:

Example 1

A 1754 foot long oilfield flowline having an interior diameter of 3.188 inches was to be lined with polyvinylchloride pipe having an outside diameter of 2.875 inches. The liner was installed and the flowline headed up in the manner described above. The air in the liner was displaced with water while holding a back pressure of about 20 p.s.i. The liner was then pressured up to about 190 p.s.i.

The air in the annular space was displaced with water while holding a back pressure of about 20 p.s.i. The water was then displaced with cement. Following are the cementing details:

Cement: neat oilwell cement containing viscosity and water loss additives.
  density—14.7 pounds per gallon
  pumping rate—15 to 30 gallons per minute
  pumping pressure—70 p.s.i. to 180 p.s.i.
  back pressure—20 p.s.i.
Liner: pressure maintained between 185 p.s.i. and 200 p.s.i.

When the annular space was completely displaced with cement, the system was shut in for 12 hours. The line was successfully pressure tested at 2000 p.s.i.

What is claimed is:

1. A method for providing a tubular thermoplastic liner in a field flowline which comprises:
   (a) installing a liner in the flowline so that it extends therethrough, said liner having a smaller outside diameter than the inside diameter of the flowline so that they define an annular space between them;
   (b) plugging one end of the liner and the inlet and outlet ends of the annular space, the end of the liner and the outlet end of the annular space being equipped with valve means which can be opened and closed as required to control flow through the liner and annular space;
   (c) displacing the contents of the liner through the liner valve means with incompressible fluid and closing the valve means;
   (d) pressuring up the fluid within the liner without rupturing it;
   (e) displacing the contents of the annular space with fluid cement while holding back pressure at the outlet end of the annular space with the valve means at that end;
   (f) controlling the cement pumping pressure and the pressure within the liner during displacement to ensure that the liner is neither collapsed nor ruptured; and (g) shutting in the system once the annular space is filled with cement for a period of time to allow the cement to set.

2. The method as set forth in claim 1 wherein:

step (e) includes displacing the contents of the annular space with water before displacing with cement; and step (f) includes controlling the pressures to ensure that the pressure within the liner is equal to or greater than the pressure in the annular space and to further ensure that the pressure within the liner does not exceed the rupture pressure of the liner.

References Cited
UNITED STATES PATENTS

| | | | |
|---|---|---|---|
| 3,482,007 | 12/1969 | Routh | 264—262 X |
| 3,223,759 | 12/1965 | Williamson III | 264—314 X |
| 3,050,786 | 8/1962 | St. John et al. | 264—94 |

ROBERT F. WHITE, Primary Examiner

J. H. SILBAUGH, Assistant Examiner

U.S. Cl. X.R.

25—38; 264—36, 89, 94, 262, 269